United States Patent
Ito

[15] 3,683,266
[45] Aug. 8, 1972

[54] INVERTER CIRCUIT USING TRANSISTORS

[72] Inventor: Hisatsugu Ito, Hachioji, Japan
[73] Assignee: Hitachi, Ltd., Tokyo, Japan
[22] Filed: March 23, 1971
[21] Appl. No.: 127,208

[30] Foreign Application Priority Data
March 27, 1970 Japan ..................... 45/25254

[52] U.S. Cl. .................... 321/44, 307/254, 307/275, 331/112
[51] Int. Cl. ...... H02m 7/52, H03k 17/00, H03k 3/30
[58] Field of Search...321/2, 44, 45 R; 307/254, 275, 307/291; 331/112

[56] References Cited

UNITED STATES PATENTS

| | | |
|---|---|---|
| 2,887,542 | 5/1959 | Blair et al. .............307/254 X |
| 3,064,177 | 11/1962 | Bender .........................321/2 |
| 3,381,202 | 4/1968 | Loucks et al. .................321/2 |
| 3,048,793 | 8/1962 | Blake ....................331/112 X |

*Primary Examiner*—William H. Beha, Jr.
*Attorney*—Craig, Antonelli & Hill

[57] ABSTRACT

A transistorized inverter circuit in which an auxiliary transistor is used in addition to the main or inverter transistor, the emitter of the former being connected with the base of the latter, and the base of the former being connected with the collector of the latter through a diode or diodes, so that the inverter circuit autonomously operates with high stability and high efficiency.

5 Claims, 5 Drawing Figures

INVENTOR

HISATSUGU ITO

BY Craig, Antonelli, Stewart & Hill
ATTORNEYS

INVERTER CIRCUIT USING TRANSISTORS

BACKGROUND OF THE INVENTION

1. Field of the Invention

This invention relates to an inverter circuit using transistors, particularly to such a circuit suitable for a high voltage power supply for an X-ray microanalizer, an electronic microscope or the like.

2. Description of the Prior Art

The conventional transistorized inverter circuit used for the above-mentioned purposes comprises a single transistor and an output transformer, the emitter and the collector of the transistor being connected respectively to one end of each of two primary windings of the transformer, and the base of the transistor being connected to a voltage source.

Such a conventional circuit, however, has an inevitable drawback in that it suffers from unstable operation and low efficiency if the load connected across the secondary winding of the output transformer varies over a wide range.

Though such a drawback may be removed by controlling the base current of the transistor according to the amount of the load, this measure is by no means practical.

SUMMARY OF THE INVENTION

The main object of this invention is to provide a transistorized inverter circuit which has high operational stability and high efficiency.

Another object of this invention is to provide a transistorized inverter circuit which autonomously operates in the optimum state in response to the amount of the load.

In order to achieve the above objects, the inverter circuit of this invention comprises an auxiliary transistor connected to the base of the main or inverter transistor, the output of the main transistor being negatively fed back to the base of the auxiliary transistor through a unidirectionally conducting element.

This invention will be described in detail in connection with the preferred embodiments of the invention and with reference to the accompanying drawings.

DESCRIPTION OF THE PREFERRED EMBODIMENTS

Figure 1:
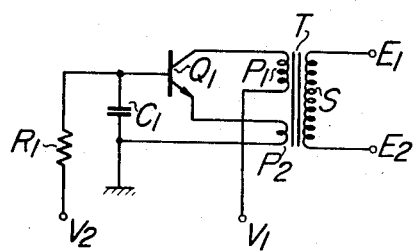
FIG. 1 is a circuit diagram of the conventional transistorized inverter circuit.

Referring to FIG. 1 which shows the conventional inverter circuit of base-grounded type, index $Q_1$ designates a transistor, T a transformer having two primary windings $P_1$ and $P_2$ and a secondary winding S, $V_1$ a terminal to which a collector voltage source is connected, $V_2$ another terminal to which a base voltage source is connected, $R_1$ a resistor, $C_1$ a capacitor, and $E_1$, $E_2$ output terminals of the inverter.

As is seen in the Figure, the collector of the transistor $Q_1$ is connected to one end of a primary winding $P_1$ of the transformer T while the emitter of the transistor $Q_1$ is connected to one end of the other primary winding $P_2$. The base of the transistor is effectively connected to ground through the capacitor $C_1$ for alternating currents and also to the voltage source terminal $V_2$ through the resistor $R_1$. The other end of the primary winding $P_1$ is connected to the collector voltage source terminal $V_1$ while the remaining end of the other primary winding $P_2$ is grounded.

In this circuit, a current supplied to the base of the transistor $Q_1$ through the source terminal $V_2$ and the resistor $R_1$ initiates and maintains an oscillation in the circuit and an AC output is obtained across the output terminals $E_1$ and $E_2$. In this operation, the transistor $Q_1$ normally operates in the saturated condition.

However, if the magnitude of the load (not shown) connected across the output terminals varies over a wide range, for example, if the load greatly increases, the transistor $Q_1$ will operate in the unsaturated condition, resulting in decreased output voltage and unstable operation. Though this problem may be obviated by setting the base current of the transistor $Q_1$ at a sufficiently large value to allow the transistor to always maintain the saturated condition regardless of the magnitude of the load, this measure makes the efficiency of the circuit very low for a small load. Another possible method for solving the above problem is to control the base source voltage (received at the terminal $V_2$) and/or the value of the resistor $R_1$ in response to the variation of the load. However, such a control is very complicated in structure as well as in operation and is not suitable for practical use.

Figure 2:
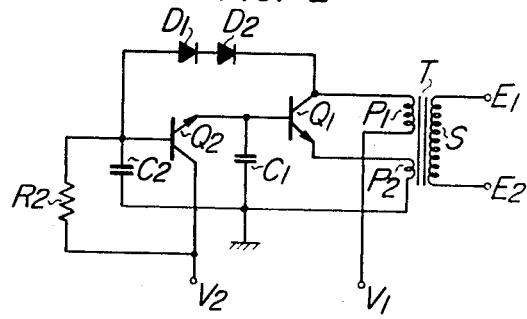
FIG. 2 is a circuit diagram of an embodiment of the inverter circuit of this invention.

Referring to FIG. 2 which shows an embodiment of the inverter circuit of this invention, an auxiliary transistor $Q_2$ is connected to the base of the main transistor $Q_1$ which is equivalent to its counterpart shown in FIG. 1. The emitter of the auxiliary transistor $Q_2$ is connected to the base of the main transistor $Q_1$ while the collector of the former is connected to the voltage source terminal $V_2$. The base of the transistor $Q_2$ is connected with the collector of the main transistor $Q_1$ through diodes $D_1$, $D_2$ to negatively feed back the collector output of the main transistor $Q_1$ to the base of the auxiliary transistor $Q_2$. Thus, the diodes $D_1$, $D_2$ are disposed in such a direction that a negative collector output of the main transistor $Q_1$ is fed back to the base of the auxiliary transistor $Q_2$ when the transistor $Q_2$ is conducting. The base of the auxiliary transistor $Q_2$ is grounded through a shunt capacitor $C_2$ and also connected to the voltage source terminal $V_2$ through a resistor $R_2$.

The operation of the inverter circuit shown in FIG. 2 will be described hereunder with reference to FIG. 3 which shows patterns of the related wave-forms.

Figure 3:
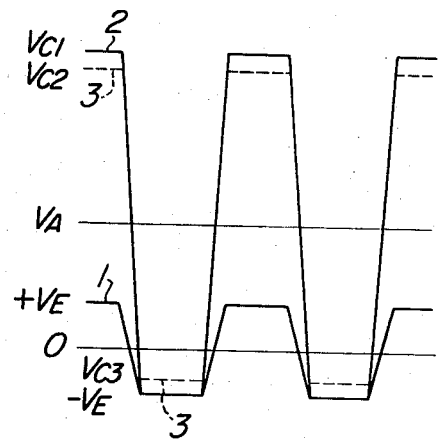
FIG. 3 is a diagram showing wave-forms relating to the operation of the circuit shown in FIG. 2.

As the mean value of the emitter voltage of the transistor $Q_1$ is nearly zero volts, the emitter voltage is expressed by a wave-form alternating between $+V_E$ and $-V_E$ with the center line at the zero volt level, as indicated by reference numeral 1 in FIG. 3. Since the collector voltage of the transistor $Q_1$ is approximately identical to the emitter voltage when the transistor is conducting in the fully saturated condition, the collector voltage assumes a wave-form as indicated by numeral 2 in FIG. 3, alternating between levels $V_{C1}$ and $-V_E$ with the center line at level $V_A$ which corresponds to the source voltage at the terminal $V_1$.

Now, if it is assumed that the transistor $Q_1$ does not reach the saturated condition for some reason, then the collector voltage thereof will not be identical to the emitter voltage. Therefore, the wave-form of the collector voltage of the transistor $Q_1$ becomes as indicated by numeral 3 in FIG. 3, alternating between levels $V_{C2}$ and $V_{C3}$, where $V_{C3}$ is higher than $-V_E$, and $V_{C2}$ is lower than $V_{C1}$.

In this state, consideration will be given to the collector current of the transistor $Q_1$ in the following paragraphs.

Assuming that the forward voltage drop across each of the diodes $D_1$, $D_2$ and $V_D$ and the base-emitter voltages of the transistors $Q_1$ and $Q_2$ are $V_{BE1}$ and $V_{BE2}$ respectively, the base voltage $V_B$ of the transistor $Q_1$ is determined by the following equation:

$$V_B = V_{C3} + 2V_D - V_{BE2} \quad (1)$$

Then, assuming that the emitter-grounded input impedance of the transistor $Q_1$ is $h_{ie}$ and the emitter-grounded current amplification factor of the same transistor is $h_{FE}$, the collector current $I_C$ of the same transistor is determined by the following equation:

$$I_C = h_{FE}(V_B + V_E - V_{BE1})/h_{ie}$$
$$= h_{FE}(V_{C3} + V_E + 2V_D - V_{BE1} - V_{BE2})/h_{ie} \quad (2)$$

If the diodes $D_1$, $D_2$ are chosen so as to satisfy the relation represented by the following equation:

$$2V_D = V_{BE1} + V_{BE2} \quad (3)$$

then, the collector current $I_C$ is expressed by the following equation:

$$I_C = h_{FE}(V_{C3} + V_E)/h_{ie} \quad (4)$$

Usually, the value of $h_{ie}$ is the order of 1 ohm and $h_{FE}$ is the order of 50. Therefore, even if the value of $V_{C3} + V_E$ is assumed to be 1 volt, the value of $I_C$ will become as large as 50 amperes. In order that the value of the collector current $I_C$ is of any reasonable magnitude, the value of $V_{C3} + V_E$ must be very small or substantially zero, that is:

$$V_{C3} + V_E = 0 \quad (5)$$

That is to say, the condition expressed by the formula (5) is inevitable with the circuit shown in FIG. 2. This suggests the fact that the emitter voltage $-V_E$ is substantially identical with the collector voltage $V_{C3}$, the transistor $Q_1$ operating in the saturated state and the output voltage is therefore approximately constant.

In other words, the operating point (that is, bias voltage) of the transistor $Q_1$ is automatically regulated by the negative feedback from the collector of the transistor $Q_1$ to the base of the transistor $Q_2$, and the collector voltage of the transistor $Q_1$ is therefore maintained at a predetermined value to keep the same transistor in the saturated condition, even if the collector voltage of the transistor $Q_1$ tends to vary so as to bring the transistor into the unsaturated condition according to a variation in the load.

Therefore, the transistor $Q_1$ is always operated at the optimum operating point or at the most suitable bias level. This ensures not only a very stable operation but a remarkably increased operation efficiency.

Though the transistors $Q_1$ and $Q_2$ have been of npn type in the above embodiment described in connection to FIG. 2, it will be obvious that transistors of pnp type can be used in the same manner. If a pnp transistor is used for the transistor $Q_1$, the diodes $D_1$, $D_2$ should be connected in such a direction that the positive output at the collector of the conducting main transistor $Q_1$ is fed back to the base of the auxiliary transistor $Q_2$. It will be needless to mention that diodes $D_1$ and $D_2$ can be replaced by a single diode in so far as the relation of the afore-mentioned equation (3) is maintained. Further, the conductivity type of the transistor $Q_1$ need not be necessarily the same as that of the transistor $Q_2$, on the condition that a separate means is provided to supply necessary current to the base of the transistor $Q_1$. Moreover, the base current of the transistor $Q_2$ may be supplied by any convenient means other than the route through the source terminal $V_2$ and the resistor $R_2$ shown in FIG. 2.

Figure 4:
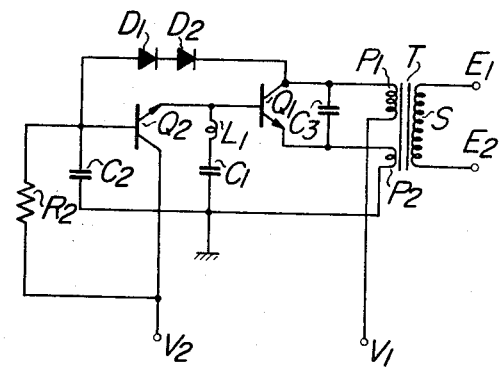
FIGS. 4 and 5 are circuit diagrams of further embodiments of the inverter circuit of this invention.

FIG. 4 shows another embodiment of the inverter circuit of this invention, which is different from the circuit shown in FIG. 2 only in a coil $L_1$ being connected in series with the capacitor $C_1$ and another capacitor $C_3$ being connected between the emitter and the collector of the transistor $Q_1$.

In this circuit, the values of the capacitor $C_1$ and the coil $L_1$ are chosen so that the resonant frequency of the series connection is approximately the same as that of the oscillation frequency of the inverter circuit thereby to prevent parasite oscillations. The capacitor $C_3$ also serves to prevent the parasitic oscillations.

Figure 5:
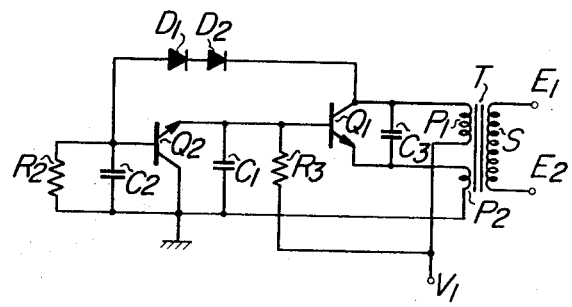

FIG. 5 shows a further embodiment of the inverter circuit of this invention, the essential difference of this embodiment from the previous ones being the elimination of the voltage source terminal $V_2$. In this embodiment, the resistor $R_2$ connected between the base of the transistory $Q_2$ and the collector of the same transistor are grounded, while the base of the transistor $Q_1$ is connected to the voltage source terminal $V_1$ through a resistor $R_3$.

With this arrangement, the oscillation is initiated by the current passing through the source terminal $V_1$, the resistor $R_3$ and the base of the transistor $Q_1$. Upon occurrence of the oscillation, a voltage represented by $-V_E + V_{BE1}$ appears at the base of the transistor $Q_1$ or at the emitter of the transistor $Q_2$. Here, $V_E$ is the afore-mentioned voltage which is shown in FIG. 3, and $V_{BE1}$ indicates the base-emitter forward voltage drop of the transistor $Q_1$. If the voltage $-V_E + V_{BE1}$ is negative voltage, it means that a proper voltage is automatically applied to the transistor $Q_2$. The operation of this circuit is substantially the same as that of the circuits shown in FIGS. 2 and 4. The base current of the transistor $Q_1$ may be supplied by any convenient means other than the route through the source terminals $V_1$ and the resistor $R_3$ shown in FIG. 5.

It will have been seen that equivalent components are indicated by corresponding index characters through FIGS. 2, 4 and 5.

I claim:

1. A DC-AC inverter circuit comprising:
   a transformer having a first primary winding, a second primary winding and a secondary winding;
   a first transistor the collector and emitter of which are respectively connected to one-end of each of said first and second primary windings, the base of said first transistor being connected to ground with respect to alternating currents;

a second transistor the emitter of which is connected to the base of said first transistor;

at least one diode connected between the collector of said first transistor and the base of said second transistor in such a direction that the collector output of said first transistor is fed back to the base of said second transistor during the conducting period of said first transistor, the forward voltage drop across said at least one diode being substantially the same as the sum of the base-emitter voltages of said first and second transistors; and means for supplying power to said transistors, whereby an AC output is derived from said secondary winding of said transformer.

2. A DC-AC inverter circuit according to claim 1, wherein said means for supplying power is connected to the base of said second transistor.

3. A DC-AC inverter circuit according to claim 1, wherein said means for supplying power is connected to the base of said first transistor.

4. A DC-AC inverter circuit according to claim 1, wherein resonant circuits are provided on the base side as well as on the collector side of said first transistor.

5. A DC-AC inverter circuit comprising:

a transformer having a first and a second primary winding and a secondary winding;

a first transistor the collector and emitter of which are respectively connected to one-end of each of said first and second primary windings;

a second transistor the emitter of which is connected to the base of said first transistor and the collector of which is grounded;

at least one diode connected between the collector of said first transistor and the base of said second transistor for feeding back the collector output of said first transistor to the base of said second transistor during the conducting period of said first transistor, the forward voltage drop across said diode being substantially the same as the sum of the base-emitter voltages of said first and second transistors;

a first capacitor connected between the base of said first transistor and ground;

a second capacitor and a first resistor connected in parallel between the base of said second transistor and ground;

a second resistor one end of which is connected to the base of said first transistors; and a power supply terminal connected to the other end of said second resistor and to the other end of said first primary winding of said transformer.

* * * * *